United States Patent
Wu et al.

(10) Patent No.: US 9,791,945 B2
(45) Date of Patent: Oct. 17, 2017

(54) OPTICAL MOUSE AND METHOD FOR PERFORMING CONFIGURED FUNCTION THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chin-Fa Wu, New Taipei (TW); Yao-Chih Yang, New Taipei (TW); Er-Hao Chen, New Taipei (TW); Chih-Wen Su, New Taipei (TW); Chen-Yu Tsai, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 1 day.

(21) Appl. No.: 15/186,649

(22) Filed: Jun. 20, 2016

(65) Prior Publication Data
US 2017/0083111 A1    Mar. 23, 2017

Related U.S. Application Data

(60) Provisional application No. 62/220,398, filed on Sep. 18, 2015.

(51) Int. Cl.
G06F 3/03 (2006.01)
G06F 3/0354 (2013.01)
G06F 3/0346 (2013.01)

(52) U.S. Cl.
CPC .......... G06F 3/0317 (2013.01); G06F 3/0346 (2013.01); G06F 3/03543 (2013.01)

(58) Field of Classification Search
CPC .. G06F 3/0317; G06F 3/0346; G06F 3/03543; G06F 3/038
See application file for complete search history.

(56) References Cited

U.S. PATENT DOCUMENTS

| 6,967,644 | B1* | 11/2005 | Kobayashi | G06F 3/0304 345/157 |
| 7,532,200 | B2 | 5/2009 | Chu | |
| 2001/0028316 | A1* | 10/2001 | Watanabe | G06F 3/03543 341/13 |

(Continued)

*Primary Examiner* — Tom Sheng
(74) *Attorney, Agent, or Firm* — Li & Cai Intellectual Property (USA) Office

(57) ABSTRACT

An optical mouse is provided with a conversion unit, a control unit, an optical sensing unit, a light emitting unit, and a switch unit. The conversion unit is electrically connected to a working voltage source, the control unit, and the optical sensing unit. The conversion unit is configured to convert voltage to supply power to the control unit, the optical sensing unit, and the light emitting unit. The control unit is electrically connected to the optical sensing unit. The switch unit is electrically connected to the light unit. When the switch unit is in a turn-off state, the light emitting unit stops emitting light toward a trace surface. The optical sensing unit senses a darkness and transfers darkness data to the control unit. The control unit performs a configured function based on the darkness data.

18 Claims, 8 Drawing Sheets

(56) References Cited

U.S. PATENT DOCUMENTS

| | | | |
|---|---|---|---|
| 2005/0162391 A1* | 7/2005 | Lin | G06F 3/0383 |
| | | | 345/163 |
| 2006/0114231 A1* | 6/2006 | Koh | G06F 1/3259 |
| | | | 345/166 |
| 2007/0222755 A1* | 9/2007 | Kajihara | G06F 3/0383 |
| | | | 345/163 |
| 2010/0013771 A1* | 1/2010 | Cheng | G06F 3/03543 |
| | | | 345/166 |
| 2010/0315333 A1* | 12/2010 | Hsu | G06F 3/0383 |
| | | | 345/157 |
| 2017/0053603 A1* | 2/2017 | Hirakata | G09G 3/3406 |

* cited by examiner

OPTICAL MOUSE AND METHOD FOR PERFORMING CONFIGURED FUNCTION THEREOF

TECHNICAL FIELD

The present disclosure relates to an optical mouse and a method for performing a configured function thereof, and more particularly, to an optical mouse with multiple configured functions and a method for performing the configured functions thereof.

BACKGROUND ART

Modern life is closely related to computer devices. A mouse has become one of the essential provisions on the periphery of a computer device. As with a keyboard, the mouse provides a user with easy operation and performance of computer programs. In particular, optical mice have replaced traditional roller ball mice since their appearance, and thus optical mice have brought convenience to operation of computers. However, for a conventional optical mouse, multi-level cursor displacement resolution is configured through a button. The button is disposed on a housing of the optical mouse. The button is directly electrically connected to a control unit of the optical mouse. Accordingly, the control unit performs corresponding configured functions based on the state or position at which the button is pressed.

For example, the conventional optical mouse has three cursor displacement resolutions, for example, 450 dpi, 1800 dpi, and 3500 dpi. The three cursor displacement resolutions are disposed at three addressed locations on the housing. When the button is adjusted to the addressed location of 1800 dpi, firmware of the control unit will perform a configured function of cursor displacement resolution of 1800 dpi. Similarly, when the button is adjusted to the addressed location of 450 dpi, firmware of the control unit will perform a configured function of cursor displacement resolution of 450 dpi.

U.S. Pat. No. 7,532,200 B2 disclosed a switching circuit and a mouse microcontroller. The switching circuit is used to configure multi-level cursor displacement resolution of a conventional optical mouse. When the conventional optical mouse requires added selections of cursor displacement resolution, the switching circuit will become a complex and interleaved switching circuit disposed on a circuit board of the conventional optical mouse. Thus, the complex and interleaved switching circuit results in inconvenience in the manufacturing process.

SUMMARY OF THE PRESENT INVENTION

One object of the present disclosure is to provide an optical mouse, in which multiple configured functions are achieved through the design of turning off light emission from a light emitting unit or blocking light outputted by the light emitting unit, thereby improving convenience of the optical mouse in use.

The present disclosure proposes an optical mouse, comprising a control unit, an optical sensing unit, and a switch unit. The optical sensing unit is electrically connected to the control unit. The switch unit is electrically connected to a light emitting unit. When the switch unit is in a turn-on state, the light emitting unit emits light toward a tracing surface, the optical sensing unit senses light reflected by the tracing surface and transfers optical data to the control unit, and the control unit generates a pointer control signal of movement of a pointing cursor based on the optical data. When the switch unit is in a turn-off state, the light emitting unit stops emitting light toward the tracing surface, the optical sensing unit senses a darkness and transfers darkness data to the control unit, and the control unit performs a configured function based on the darkness data.

The present disclosure proposes an optical mouse, comprising a control unit, an optical sensing unit, and a shutter unit. The optical sensing unit is electrically connected to the control unit. The shutter unit is disposed between a light emitting unit and a light guiding unit. When the shutter unit is in a non-light-blocking state, the light emitting unit emits light toward a tracing surface, the optical sensing unit senses light reflected by the tracing surface and transfers optical data to the control unit, and the control unit generates a pointer control signal of movement of a pointing cursor based on the optical data; when the shutter unit is in a light-blocking state, the shutter unit blocks light emitted by the light emitting unit toward the light guiding unit, the optical sensing unit senses a darkness and transfers darkness data to the control unit, and the control unit performs a configured function based on the darkness data.

The present disclosure proposes a method for performing a configured function of an optical mouse, wherein the optical mouse is provided with a control unit, an optical sensing unit, and a light emitting unit, and the control unit is electrically connected to the optical sensing unit. The method includes: a switch unit being electrically connected to the light emitting unit, the switch unit being in a turn-off state to cause the light emitting unit to stop emitting light; sensing a darkness and transferring darkness data to the control unit by the optical sensing unit; and performing a configured function based on the darkness data by the control unit.

The present disclosure proposes a method for performing a configured function of an optical mouse, wherein the optical mouse is provided with a control unit, an optical sensing unit, and a light emitting unit, and the control unit is electrically connected to the optical sensing unit. The method includes: a shutter unit being used to block light outputted by the light emitting unit, the shutter unit being in a light-blocking state to cause the shutter unit to block light emitted by the light emitting unit toward a light guiding unit; sensing a darkness and transferring darkness data to the control unit by the optical sensing unit; and performing a configured function based on the darkness data by the control unit.

Specific means of the present disclosure use an optical mouse, in which through the design of turning off light emission from a light emitting unit or blocking light outputted by the light emitting unit, the optical mouse is caused to generate a darkness or darkness pattern, and a control unit determines variations in shadings such as the darkness or darkness pattern to perform corresponding configured functions, thereby improving convenience of the optical mouse in use.

The summary above and the embodiments below are intended to further illustrate the technical means and effects of the present disclosure, but the described embodiments and the drawings are only provided for reference and description and not intended to limit the present disclosure.

DETAILED DESCRIPTION OF THE EMBODIMENTS

Figure 1:
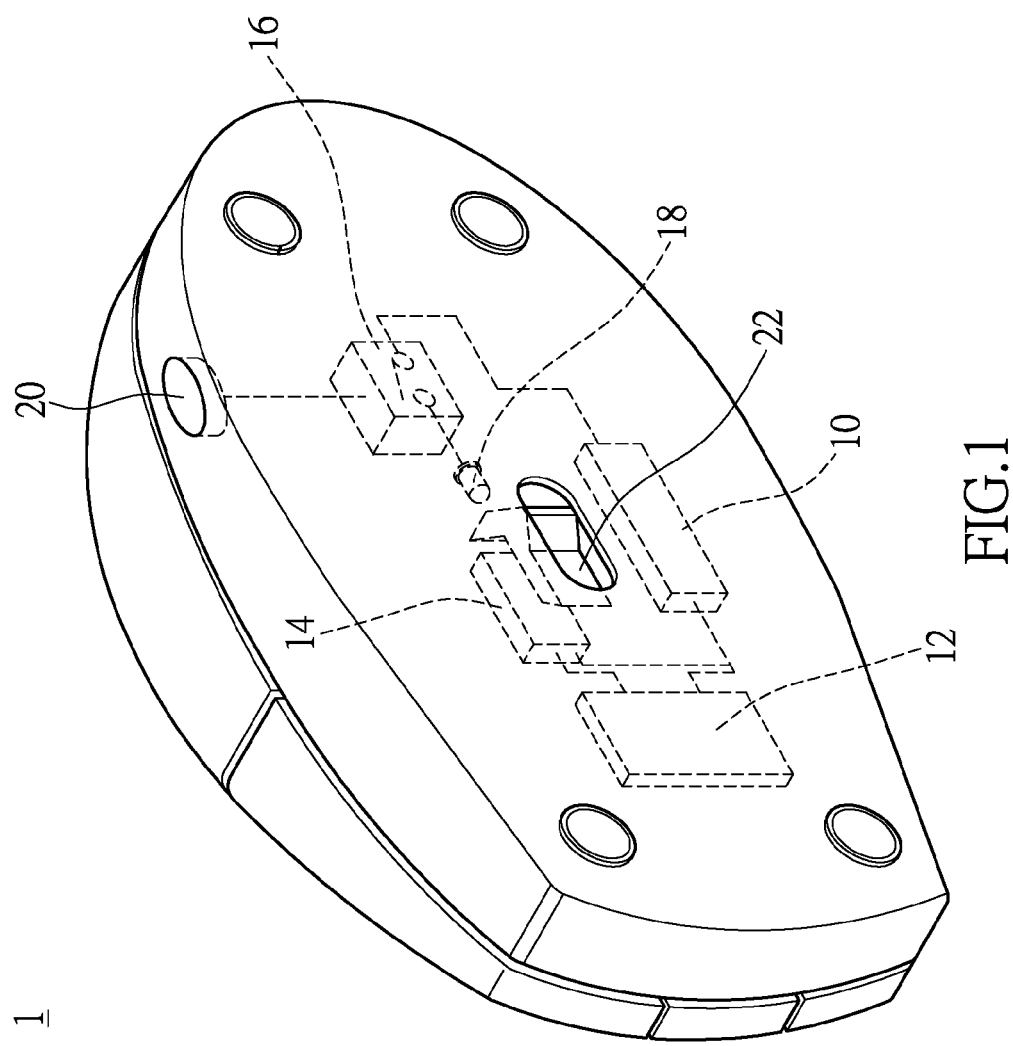
FIG. 1 is a perspective schematic view of an optical mouse according to one embodiment of the present disclosure.
Figure 2:
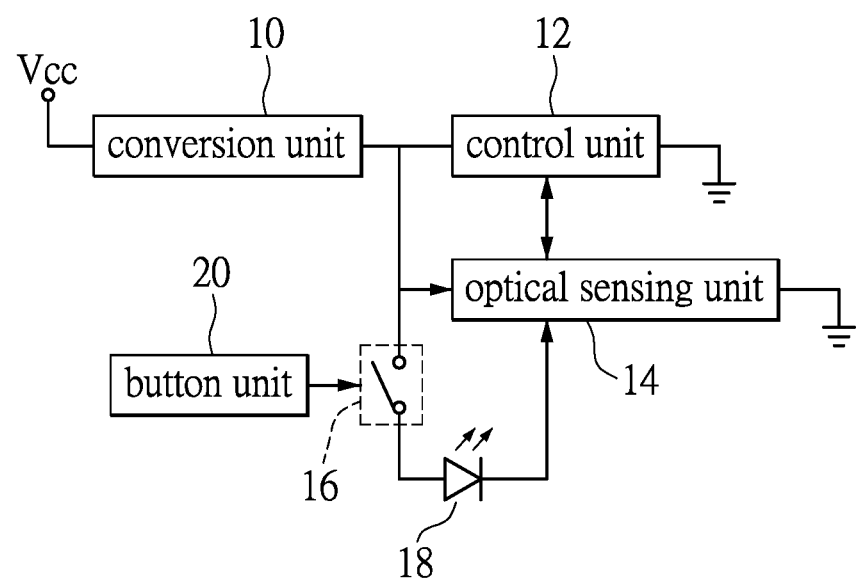
FIG. 2 is a schematic view of a configured circuit of the optical mouse according to the embodiment of the present disclosure in FIG. 1.

FIG. 1 is a perspective schematic view of an optical mouse according to one embodiment of the present disclosure. FIG. 2 is a schematic view of a configured circuit of the optical mouse according to the embodiment of the present disclosure in FIG. 1. Please refer to FIG. 1 and FIG. 2. An optical mouse 1 comprises a conversion unit 10, a control unit 12, an optical sensing unit 14, a switch unit 16, a light emitting unit 18, at least one button unit 20, and a light guiding unit 22.

In practice, the conversion unit 10 is electrically connected to a working voltage source, the control unit 12, and the optical sensing unit 14. The conversion unit 10 is configured to convert voltage to supply power to the control unit 12, the optical sensing unit 14, and the light emitting unit 18. The control unit 12 is electrically connected to the optical sensing unit 14. The switch unit 16 is electrically connected between the light emitting unit 18 and the conversion unit 10. The at least one button unit 20 is electrically connected to the switch unit 16. This aspect of the optical mouse 1 is not limited in the present embodiment.

For ease of illustration, the at least one button unit 20 in the present embodiment is described with a setting button. The setting button is disposed on a housing of the optical mouse 1, different from a right mouse button, a left mouse button, a roller ball, or other original mouse buttons. In other embodiments, the at least one button unit 20 also may be implemented through one of the right mouse button, the left mouse button, the roller ball, and other buttons, or a combination thereof. For example, turning-on or turning-off operations of the switch unit 16 are achieved by pressing the right mouse button and the left mouse button simultaneously by a user. This aspect and number of the at least one button unit 20 is not limited in the present embodiment.

In particular, the conversion unit 10 is, for example, one of a DC to DC conversion circuit, a buck circuit, a boost circuit, and a buck-boost circuit, or a combination thereof. In practice, the conversion unit 10 is configured to convert voltage to supply power to the control unit 12, the optical sensing unit 14, and the light emitting unit 18. This aspect of the conversion unit 10 is not limited in the present embodiment.

The control unit 12 is, for example, a central processing unit (CPU), a microcontroller unit (MCU), or a digital signal processor, for performing operation and processing of signals within the optical mouse 1. In practice, the control unit 12 is used to receive optical data, darkness data, or darkness pattern data from the optical sensing unit 14, and identify a tracing feature in the optical data; or determine the darkness data or darkness pattern data to perform a configured function. This aspect of the control unit 12 is not limited in the present embodiment.

The optical sensing unit 14 is, for example, a CCD camera, a CMOS image sensor, an image detector, or another photosensitive component. In practice, the optical sensing unit 14 is used to sense light reflected by a tracing surface; or sense a movement distance and movement direction of a light spot generated by the optical mouse 1; or sense an instantaneous darkness or darkness pattern. This aspect of the optical sensing unit 14 is not limited in the present embodiment.

The light emitting unit 18 is selected from an LED or an OLED emitting blue light, white light, green light, blue-green light, yellow-red light, and IR light in any combination; or the light emitting unit 18 is a laser or laser diode emitting laser; or the light emitting unit 18 is another light source. In addition, the number of the light emitting unit 18 may be one or more. This aspect of the light emitting unit 18 is not limited in the present embodiment.

The switch unit 16 is, for example, an FET, a MOSFET, a switching switch, or another electronic component. In practice, the optical mouse 1 can turn on or turn off light outputted by the light emitting unit 18 through the switch unit 16. The optical sensing unit 14 will sense a light spot image caused by the light, or sense a darkness caused by turning off the light emission. When the optical sensing unit 14 senses the darkness, darkness data is generated and transferred to the control unit 12. The control unit 12 performs a corresponding operation and processing on the darkness data.

That is, in the case of general mouse use, the optical mouse 1 generates a pointer control signal of movement of a pointing cursor still through the light spot imaging technique. In the situation where cursor displacement resolution or another function of the mouse is adjusted or configured, the switch unit 16 turns off and the optical mouse 1 obtains a darkness reading through the optical sensing unit 14 to generate a configured cursor displacement resolution or another function of the mouse.

Further, when the switch unit 16 is in a turn-on state, the light emitting unit 18 emits light toward a tracing surface. The optical sensing unit 14 senses light reflected by the tracing surface and transfers optical data to the control unit 12. The control unit 12 generates a pointer control signal of movement of a pointing cursor based on the optical data. That is, the optical mouse 1 detects movement of the optical mouse 1 relative to a tracing surface of a pad through a light emitting unit 18 and an optical sensing unit 14, whereby the optical mouse 1 outputs a pointer control signal to a computer device (not shown).

Additionally, when the switch unit 16 is in a turn-off state, the light emitting unit 18 stops emitting light toward the tracing surface. The optical sensing unit 14 senses a darkness and transfers darkness data to the control unit 12. The control unit 12 performs a configured function based on the darkness data. That is, the optical mouse 1 turns off the light emission of the light emitting unit 18 through a switch unit 16, whereby the optical sensing unit 14 senses an instantaneous darkness and determines variations in shadings through the control unit 12 to perform a configured function.

In addition, turning-on or turning-off operations of the switch unit 16 may be achieved through an adjustment mechanism. The adjustment mechanism is achieved by, for example, a button circuit, a manual switch circuit, a self-controlled switch circuit, a self-driven switch circuit, or another circuit. The aspect of the adjustment mechanism is not limited in the present embodiment. For example, the button unit 20 activates the switch unit 16 through a button. When the button unit 20 is pressed, the switch unit 16 is in a turn-off state instantaneously, such that the light emitting unit 18 instantaneously stops emitting light to generate the darkness in a tracing space within the optical mouse 1.

It is to be noted that when the button unit 20 is pressed, the switch unit 16 also may be instantaneously at any permutation of at least one turn-off state and at least one turn-on state, such that the light emitting unit 18 generates a darkness pattern based on any permutation of at least one turn-off state and at least one turn-on state. The optical sensing unit 14 senses the darkness pattern and transfers darkness pattern data to the control unit 12. The control unit 12 performs a configured function based on the darkness pattern data. The darkness pattern is, for example, a code signal instructing the control unit 12 to perform a corresponding configured function.

Further, the instantaneous darkness may be achieved through the darkness pattern. The darkness pattern comprises at least one darkness time zone and at least one bright time zone. Any combination of at least one darkness time zone and at least one bright time zone may be viewed as a Morse code or another code. The optical sensing unit 14 will sense the darkness pattern and transfers the darkness pattern data to the control unit 12. The control unit 12 determines the darkness pattern data to perform a corresponding configured function.

For example, this is described with darkness patterns of a darkness time zone and a bright time zone arranged in order. The darkness pattern includes four patterns. The first pattern is, for example, a long darkness time zone and a long bright time zone arranged in order. The second pattern is, for example, a short darkness time zone and a short bright time zone arranged in order. The third pattern is, for example, a long darkness time zone and a short bright time zone arranged in order. The fourth pattern is, for example, a short darkness time zone and a long bright time zone arranged in order. The first, second, third, and fourth patterns indicate, for example, a first, second, third, and fourth cursor displacement resolution respectively. The first cursor displacement resolution indicates, for example, a maximum cursor sensitivity. The fourth cursor displacement resolution indicates, for example, a minimum cursor sensitivity. The second and third cursor displacement resolutions indicate, for example, a second cursor sensitivity and a third cursor sensitivity respectively.

When the optical sensing unit 14 senses the darkness pattern as the first pattern, the control unit 12 performs a configured function of the maximum cursor sensitivity. That is, the control unit 2 adjusts the cursor sensitivity to the maximum. On the contrary, when the optical sensing unit 14 senses the darkness pattern as the fourth pattern, the control unit 12 performs a configured function of the minimum cursor sensitivity. That is, the control unit 2 adjusts the cursor sensitivity to the minimum. In other words, during the instantaneous darkness, the control unit 12 can determine the darkness pattern like a code, to perform a corresponding configured function.

In other embodiments, the instantaneous darkness also may be a variation in shadings of a darkness, a brightness, and a darkness in a non-fixed time length; or a variation in shadings of a plurality of darknesses and a plurality of brightnesses. Each darkness or each brightness has two time lengths such as a long time length or a short time length, or multiple time lengths. As such, a darkness pattern of two darknesses and one brightness has eight patterns. Accordingly, these eight patterns may indicate corresponding configured functions respectively, for example, cursor displacement resolution, mouse configuration setting, game configured function, picture switching, or another function. In addition, the darkness pattern also may be a variation in shadings of at least one darkness and at least one brightness in a fixed time length, and for example, the fixed time length of the darkness pattern is 2 μs.

Generally, a traditional button unit is electrically connected to a traditional control unit. The traditional control unit requires at least one input/output port (IO port) to be electrically connected to a traditional switching circuit, as described in U.S. Pat. No. 7,532,200 B2. However, in the present embodiment, the IO port electrically connected to the traditional switching circuit is not required for the control unit 12. The switch unit 16 is electrically connected to the light emitting unit 18, and not electrically connected to the control unit 12.

In other words, the present embodiment has no complex and interleaved traditional switching circuit, to achieve multi-level cursor displacement resolution switching or setting. The present embodiment employs a simple switch unit 16, to achieve multi-level cursor displacement resolution switching or setting. For example, during a turning-off operation of the switch unit 16, the optical sensing unit 14 senses the instantaneous darkness. The control unit 12 determines the instantaneous darkness data or darkness pattern data to perform a corresponding configured function.

Figure 3A:
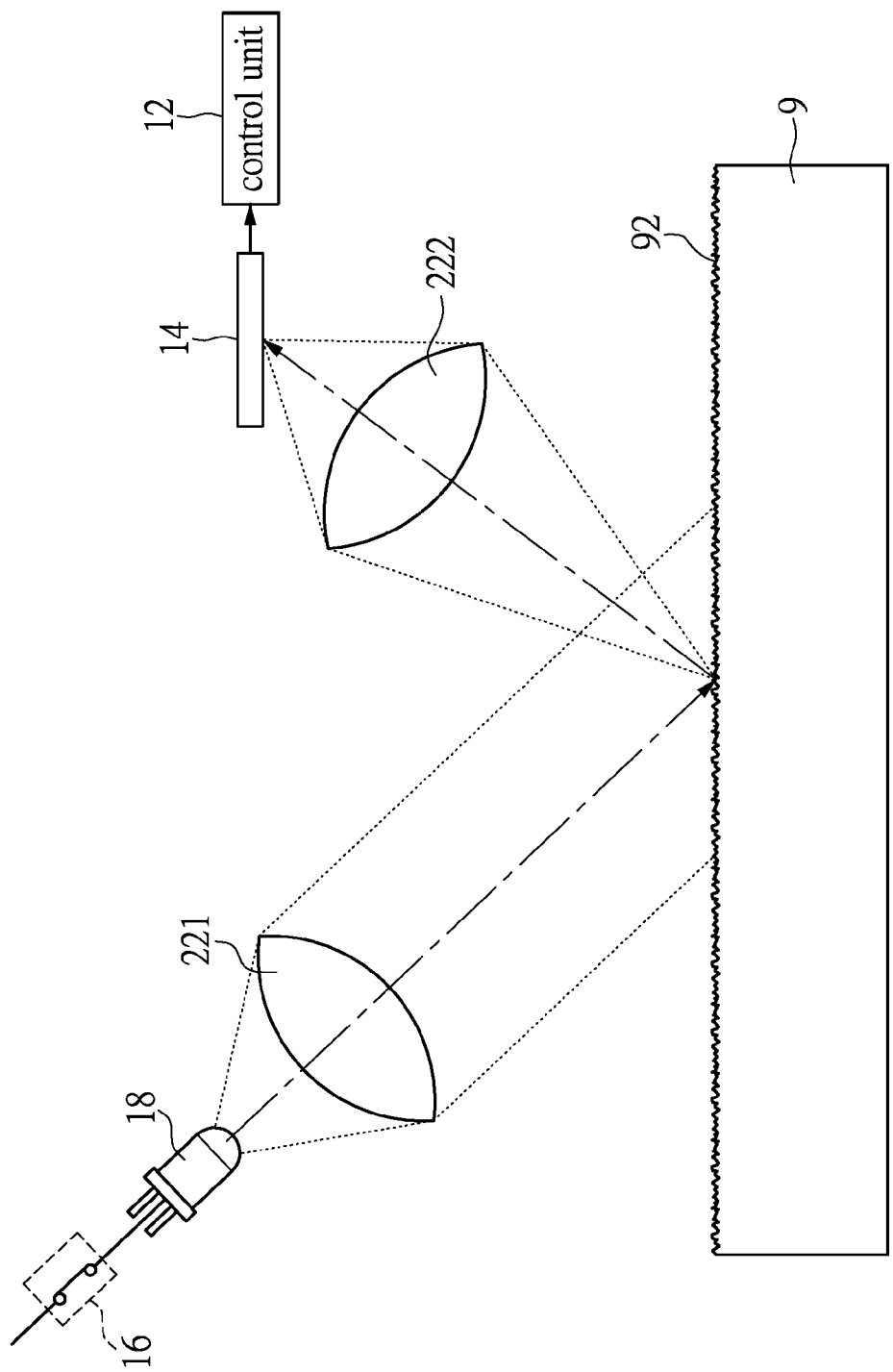
FIG. 3A is a schematic view of an optical architecture of the optical mouse according to the embodiment of the present disclosure.
Figure 3B:
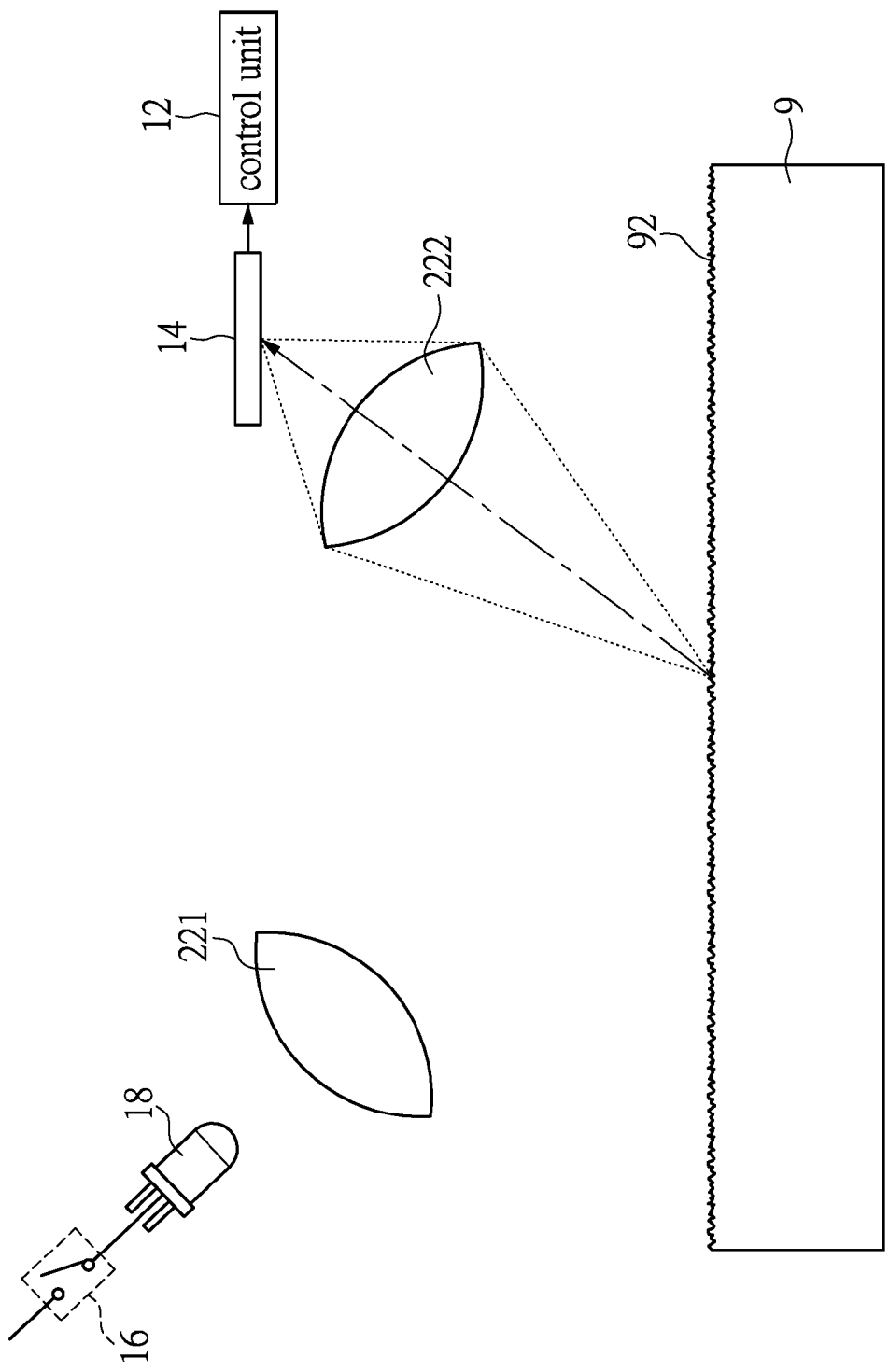
FIG. 3B is a schematic view of an optical architecture of the optical mouse according to the embodiment of the present disclosure in FIG. 3A.

FIG. 3A is a schematic view of an optical architecture of the optical mouse according to an embodiment of the present disclosure. FIG. 3B is a schematic view of an optical architecture of the optical mouse according to the embodiment of the present disclosure in FIG. 3A. Please refer to FIG. 3A and FIG. 3B. The switch unit 16 in FIG. 3A is in a turn-on state. The switch unit 16 in FIG. 3B is in a turn-off state.

In particular, the optical mouse 1 comprises a switch unit 16, a light emitting unit 18, a first lens 221, a second lens 222, an optical sensing unit 14, and a control unit 12. The light guiding unit 22 in the present embodiment is described with two lenses 221, 222. The optical architecture formed by the light emitting unit 18, the first lens 221, the second lens 222, the optical sensing unit 14, and the control unit 12 is shown in FIG. 3A.

In particular, the first lens 221 is, for example, a collimating lens, and the first lens 221 is disposed between the light emitting unit 18 and a tracing surface 92 of a pad 9, for collimating light. Light emitted by the light emitting unit 18 is collimated via the first lens 221 to be irradiated on the tracing surface 92 of the pad 9. A part of the incident light is reflected from the tracing surface 92, and light reflected from the tracing surface 92 is focused via the second lens 222 to be received by the optical sensing unit 14.

Briefly, light reflected from the tracing surface 92 is imaged on the optical sensing unit 14 via the second lens 222. The optical sensing unit 14 is placed at a specular angle or a nearly-specular angle relative to the light emitting unit 18. Hence, the optical sensing unit 14 can detect the light reflected from the tracing surface 92.

In other words, the light emitting unit 18 emits light with a certain frequency onto the tracing surface 92 at which the optical mouse 1 is located. The tracing surface 92 generally has certain texture features. The incident light emitted by the light emitting unit 18 is reflected by the tracing surface 92 and focused via the optical lenses 221, 222 to be inputted on the optical sensing unit 14. Then, the optical sensing unit 14 generates optical data of a voltage or current signal according to the intensity of the reflected light, and the control unit 12 converts the voltage or current signal into a digital signal, namely, an image of the tracing surface 92 is digitized. The sampled image is calculated by the control unit 12 to determine a displacement of the optical mouse 1. The travel path or manner of light waves is shown in FIG. 3A.

Then, the switch unit 16 shown in FIG. 3B is in a turn-off state. Thus, the light emitting unit 18 stops emitting light. The first lens 221 of the light guiding unit 22 receives no light. Hence, the bottom of the optical mouse 1 and the tracing surface 92 are subjected to an instantaneous darkness. Thus, the optical sensing unit 14 receives the instantaneous darkness through the second lens 222. Accordingly, darkness data is generated by the optical sensing unit 14 and transferred to the control unit 12. The control unit 12 performs a corresponding configured function based on the darkness data.

The instantaneous darkness or darkness pattern is for example a trigger signal. The trigger signal is used to enable firmware of the control unit 12, such that the firmware of the control unit 12 can determine the instantaneous darkness or darkness pattern to perform a configured function. During the instantaneous darkness, no calculation of light spot movement, movement distance, and movement direction of the optical mouse 1 is performed by the firmware of the control unit 12.

Briefly, when the button unit 20 is not pressed, the switch unit 16 remains in a turn-on state, and the light emitting unit 18 still continues to emit light. On the contrary, when the button unit 20 is pressed, the button unit 20 causes the switch unit 16 to be in a turn-off state. For example, the switch unit 16 is switched into a turn-off state for an instantaneous time (e.g. X μs where X may be any value), and then the switch unit 16 is switched into a turn-on state again.

The light emitting unit 18 instantaneously stops emitting light according to the operation of the switch unit 16. When the light emitting unit 18 stops emitting light, the optical sensing unit 14 senses the instantaneous darkness or darkness pattern. The firmware of the control unit 12 can determine the instantaneous darkness or darkness pattern and perform a configured function. The configured function is, for example, switching a cursor displacement resolution, switching a game picture, switching a screen, or setting a game function and so on. The aspect of the configured function is not limited in the present embodiment.

Figure 4:
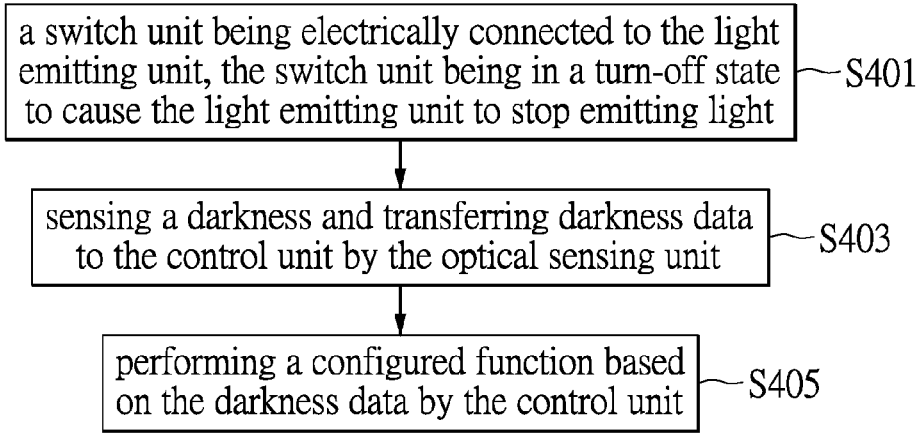
FIG. 4 is a process flow diagram of a method for performing a configured function of an optical mouse according to another embodiment of the present disclosure.

FIG. 4 is a process flow diagram of a method for performing a configured function of an optical mouse according to another embodiment of the present disclosure. Please refer to FIG. 4. A method for performing a configured function of an optical mouse is shown, wherein the optical mouse is provided with a conversion unit, a control unit, an optical sensing unit, and a light emitting unit. The conversion unit is electrically connected to a working voltage source, the control unit, the optical sensing unit, and the light emitting unit. The conversion unit is configured to convert voltage to supply power to the control unit, the optical sensing unit, and the light emitting unit. The control unit is electrically connected to the optical sensing unit. The method comprises the following steps.

In step S401, a switch unit is electrically connected to the light emitting unit. The switch unit is in a turn-off state to cause the light emitting unit to stop emitting light. In practice, when the switch unit is switched into a turn-on state, the light emitting unit emits light. On the contrary, when the switch unit is switched into a turn-off state, the light emitting unit stops emitting light.

In step S403, the optical sensing unit senses a darkness and transfers darkness data to the control unit. In practice, the optical sensing unit is always in a state sensing a light spot image or darkness image. Thus, when the light emitting unit stops emitting light, the optical sensing unit senses a darkness and transfers darkness data to the control unit. The control unit determines a variation in shadings to perform a corresponding configured function. Hence, in step S405, the control unit performs a configured function based on the darkness data. The process flow in the present embodiment applies to the optical mouse in FIG. 1, FIG. 2, FIG. 3A, and FIG. 3B in the previous embodiment. The process flow of FIG. 4 is not limited in the present embodiment.

Figure 5:
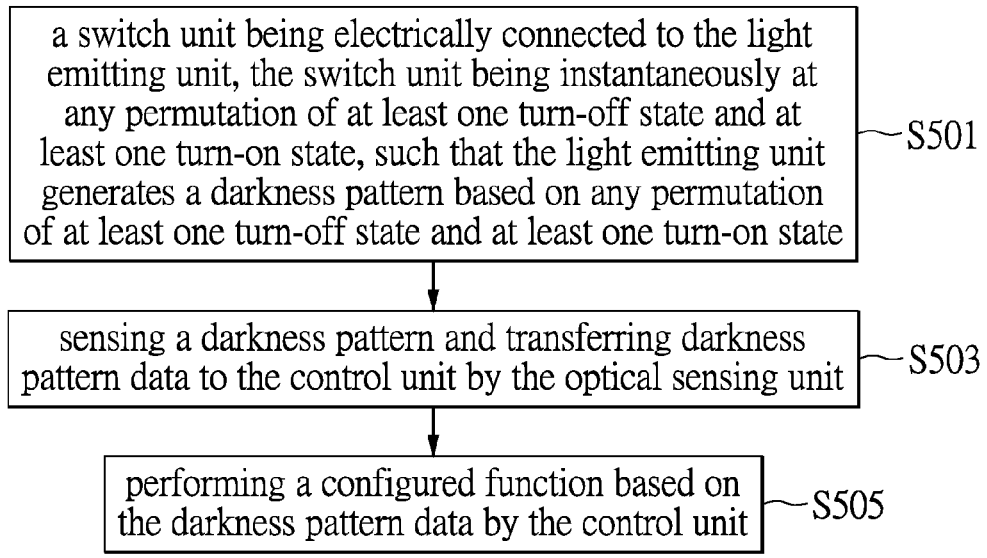
FIG. 5 is a process flow diagram of a method for performing a configured function of an optical mouse according to another embodiment of the present disclosure.

FIG. 5 is a process flow diagram of a method for performing a configured function of an optical mouse according to another embodiment of the present disclosure. Please refer to FIG. 5. FIG. 5 is similar to the method for performing a configured function of an optical mouse in FIG. 4, with a difference that in step S501, the switch unit is instantaneously at any permutation of at least one turn-off state and at least one turn-on state, such that the light emitting unit generates a darkness pattern based on any permutation of at least one turn-off state and at least one turn-on state.

In practice, the darkness pattern is a combination of optical brightness and darkness. For example, the light emitting unit generates a darkness, a brightness, a darkness, a combination of optical variations of darkness and brightness in order in a fixed time length. Such a combination of optical variations, for example, indicates a particular configured function of the optical mouse, for example, a configured cursor displacement resolution of 1800 dpi. Similarly, those ordinarily skilled in the art can freely design "a darkness pattern and a corresponding configured function thereof". This aspect of the darkness pattern is not limited in the present embodiment.

In step S503, the optical sensing unit senses a darkness pattern and transfers the darkness pattern data to the control unit. The control unit determines a variation in shadings to perform a corresponding configured function. Hence, in step S505, the control unit performs a configured function based on the darkness pattern data. The process flow in the present embodiment applies to the optical mouse in FIG. 1, FIG. 2, FIG. 3A, and FIG. 3B in the previous embodiment. The present embodiment is not limited to the process flow of FIG. 5.

Figure 6:
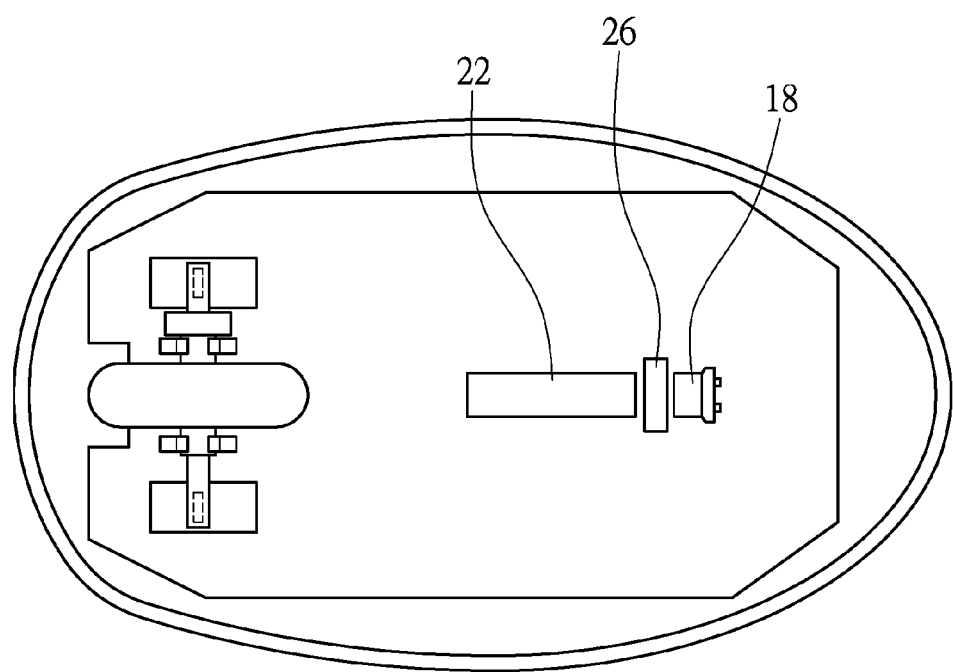
FIG. 6 is a schematic view of an optical mouse according to another embodiment of the present disclosure.

FIG. 6 is a schematic view of an optical mouse according to another embodiment of the present disclosure. Please refer to FIG. 6. An optical mouse 1a is provided with a conversion unit 10, a control unit 12, an optical sensing unit 14, a light emitting unit 18, at least one button unit 20, a shutter unit 26, and a light guiding unit 22. The conversion unit 10 is electrically connected to a working voltage source, the control unit 12, the optical sensing unit 14, and the light emitting unit 18. The conversion unit 10 is configured to convert voltage to supply power to the control unit 12, the optical sensing unit 14 and the light emitting unit 18. The control unit 12 is electrically connected to the optical sensing unit 14. The shutter unit 26 is disposed between the light emitting unit 18 and the light guiding unit 22. The at least one button unit 20 is connected with the shutter unit 26.

When the shutter unit 26 is in a non-light-blocking state, the light emitting unit 18 emits light toward a tracing surface. The optical sensing unit 14 senses light reflected by the tracing surface and transfers optical data to the control unit 12. The control unit 12 generates a pointer control signal of movement of a pointing cursor based on the optical data.

When the shutter unit 26 is in a light-blocking state, the shutter unit 26 blocks light emitted by the light emitting unit 18 toward the light guiding unit 22. The optical sensing unit 14 senses a darkness and transfers darkness data to the control unit 12, and the control unit 12 performs a configured function based on the darkness data. For example, when the at least one button unit 20 is pressed, the shutter unit 26 is in a light-blocking state instantaneously, such that the light emitting unit 18 stops emitting light instantaneously to generate a darkness.

In particular, the shutter unit 26 is achieved, for example, by a movable light shielding plate, a movable light shielding sheet, or a camera shutter. The aspect of the shutter unit 26 is not limited in the present embodiment. In practice, when the shutter unit 26 is in a light-blocking state, light cannot pass through the shutter unit 26, whereby the optical sensing unit 14 above the light guiding unit 22 senses an instantaneous darkness or darkness pattern. The firmware of the control unit 12 determines the instantaneous darkness or darkness pattern to select a corresponding configured function.

On the contrary, when the shutter unit 26 is in a non-light-blocking state, light directly enters into the light guiding unit 22, whereby the optical sensing unit 14 above the light guiding unit 22 senses a light spot image. The firmware of the control unit 12 generates a pointer control signal of movement of a pointing cursor based on the optical data. That is, when the shutter unit 26 is in a non-light-blocking state, the optical mouse 1a in the present embodiment is generally the same as the general optical mouse.

It is to be noted that when the at least one button unit 20 is pressed, the shutter unit 26 is instantaneously at any permutation of at least one light-blocking state and at least one non-light-blocking state, such that the light emitting unit 18 generates a darkness pattern based on any permutation of at least one light-blocking state and at least one non-light-blocking state. The optical sensing unit 14 senses the darkness pattern and transfers the darkness pattern data to the control unit 12. The control unit 12 performs a configured function based on the darkness pattern data. The darkness pattern is, for example, a code signal instructing the control unit 12 to perform a corresponding configured function.

Based on the forgoing, in the present embodiment, the darkness or darkness pattern is generated by light shielding through the shutter unit 26. The optical sensing unit 14 senses an instantaneous darkness or darkness pattern, and accordingly generates darkness data or darkness pattern data. The control unit 12 determines a variation in shadings to perform a corresponding configured function. The present embodiment is different from the previous embodiment in that the present embodiment does not have the switch unit 16 of the previous embodiment. In the previous embodiment, the darkness or darkness pattern is generated through a turn-off state of the switch unit 16. Both embodiments above can achieve multi-level cursor displacement resolution switching, setting, or multiple configured functions. This aspect of the optical mouse 1a is not limited in the present embodiment.

Figure 7A:
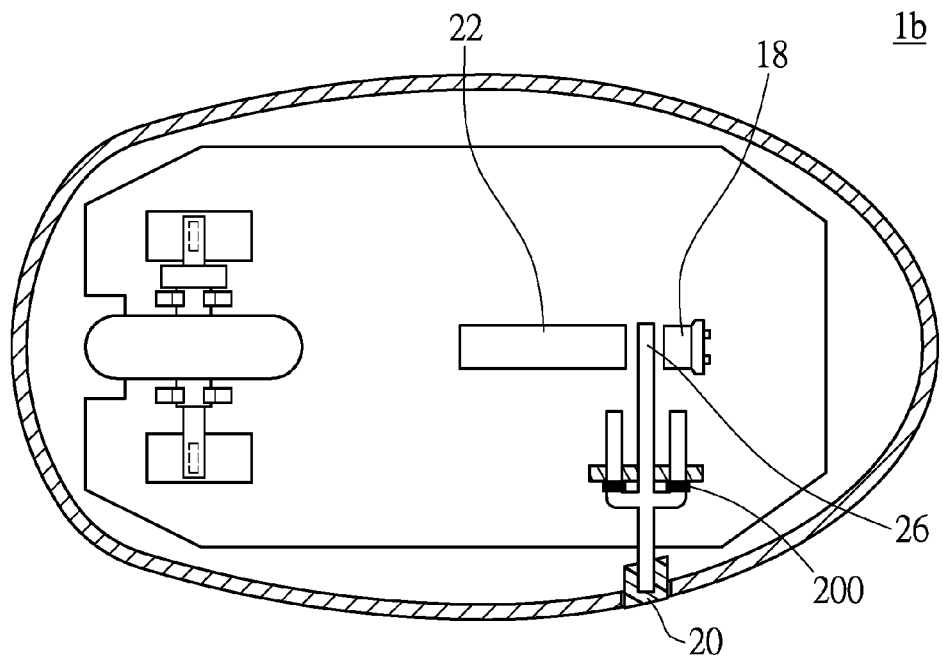
FIG. 7A is a schematic view of an optical mouse according to another embodiment of the present disclosure.
Figure 7B:
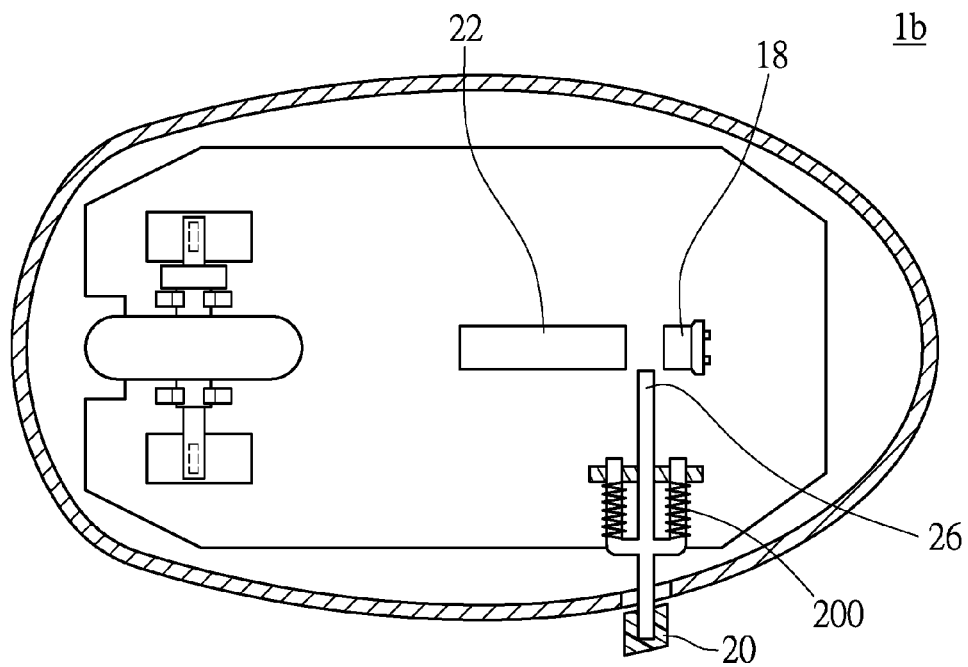
FIG. 7B is a schematic view of the optical mouse according to the embodiment of the present disclosure in FIG. 7A.

FIG. 7A is a schematic view of an optical mouse according to another embodiment of the present disclosure. FIG. 7B is a schematic view of the optical mouse according to the embodiment of the present disclosure in FIG. 7A. Please refer to FIG. 7A and FIG. 7B. FIG. 7A shows an optical mouse 1b with a shutter unit 26 being in a light-blocking state. FIG. 7B shows the optical mouse 1b with the shutter unit 26 being in a non-light-blocking state.

In particular, at least one button unit 20 comprises an elastic element 200, connected to the shutter unit 26. The elastic element 200 is used to provide a recovering force for the shutter unit 26 such that the shutter unit 26 is restored from the light-blocking state to the non-light-blocking state. In practice, the elastic element 200 is, for example, a spring, a plastic, or a rubber elastomer. The aspect of the elastic element 200 is not limited in the present embodiment. Additionally, the button unit 20 and the shutter unit 26 may be an actuating mechanism in an integral design or combinational design. The elastic element 200 is disposed on the integral design or combinational design of the button unit 20 and the shutter unit 26.

For example, a user adjusts cursor displacement resolution through the button unit 20. Therefore, the user presses the button unit 20, whereby the shutter unit 26 is actuated to block light between the light emitting unit 18 and the light guiding unit 22, as shown in FIG. 7A. The elastic element 200 is compressed and deformed, such that a recovering force or restoring force for recovering the button unit 20 is stored by the elastic element 200.

Then, when the button unit 20 is released, the recovering force stored in the elastic element 200 actuates the shutter unit 26 and the button unit 20, whereby the shutter unit 26 and the button unit 20 are restored to their original positions, as shown in FIG. 7B. In other embodiments, a single pressing of the button unit 20 also may result in multiple actuations of the shutter unit 26, thereby generating a darkness pattern with variations in shadings. A person of ordinary skill in the art can freely design a mechanism for multiple actuations of "the shutter unit 26 and the button unit 20".

Figure 8:
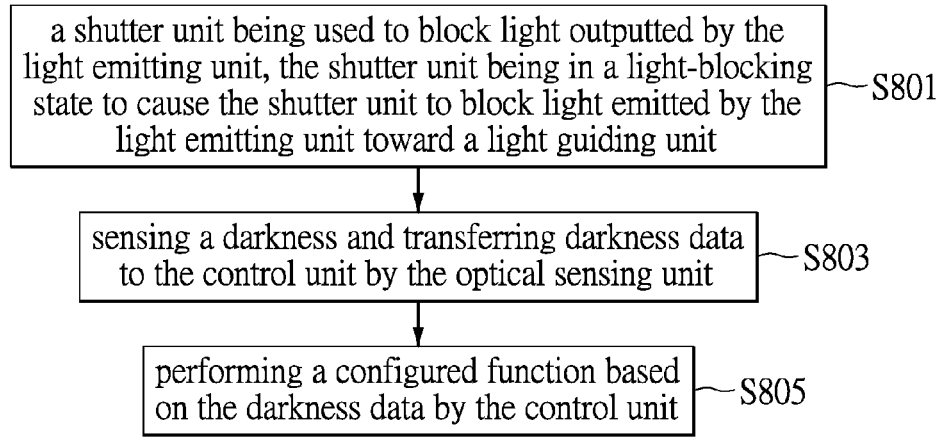
FIG. 8 is a process flow diagram of a method for performing a configured function of an optical mouse according to another embodiment of the present disclosure.

FIG. 8 is a process flow diagram of a method for performing a configured function of an optical mouse according to another embodiment of the present disclosure. Please refer to FIG. 8. A method for performing a configured function with an optical mouse is shown, wherein the optical mouse is provided with a conversion unit, a control unit, an optical sensing unit, and a light emitting unit. The conversion unit is electrically connected to a working voltage source, the control unit, the optical sensing unit, and the light emitting unit. The conversion unit is configured to convert voltage to supply power to the control unit, the optical sensing unit and the light emitting unit. The control unit is electrically connected to the optical sensing unit. The method comprises the following steps.

In step S801, a shutter unit is used to block light outputted by the light emitting unit, and the shutter unit is in a light-blocking state to cause the shutter unit to block light emitted by the light emitting unit toward a light guiding unit. In practice, the shutter unit is disposed between the light emitting unit and the light guiding unit. The shutter unit is used to break light emitted from the light emitting unit from entering into the light guiding unit.

Then, in step S803, the optical sensing unit senses a darkness and transfers darkness data to the control unit. The control unit determines a variation in shadings to perform a corresponding configured function. Hence, in step S805, the control unit performs a configured function based on the darkness data. The process flow in the present embodiment applies to the optical mice in FIG. 6, FIG. 7A, and FIG. 7B in the previous embodiments. The process flow of FIG. 8 is not limited in the present embodiment.

Figure 9:
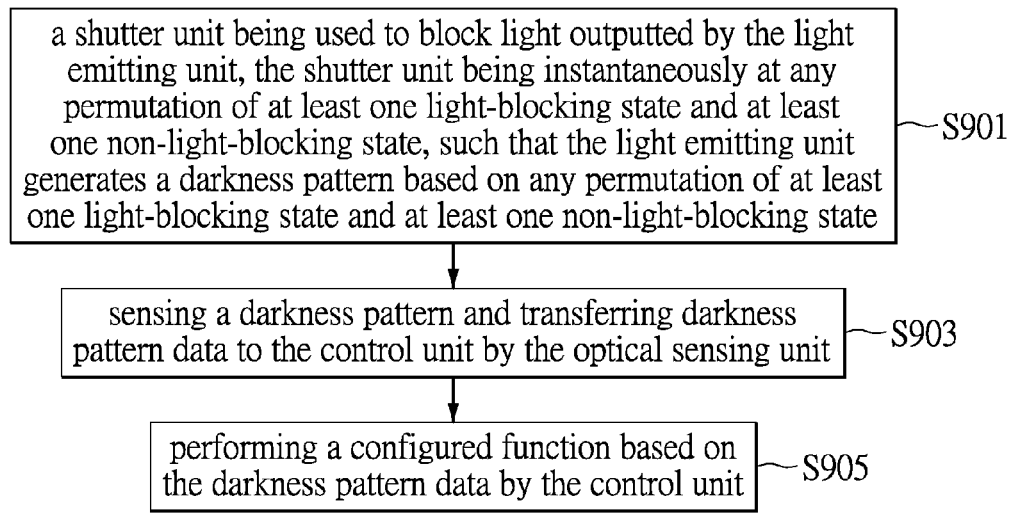
FIG. 9 is a process flow diagram of a method for performing a configured function of an optical mouse according to another embodiment of the present disclosure.

FIG. 9 is a process flow diagram of a method for performing a configured function of an optical mouse according to another embodiment of the present disclosure. Please refer to FIG. 9. FIG. 9 is similar to the method for performing a configured function of an optical mouse in FIG. 8, with a difference that in step S901, the shutter unit is instantaneously at any permutation of at least one light-blocking state and at least one non-light-blocking state, such that the light emitting unit generates a darkness pattern based on any permutation of at least one light-blocking state and at least one non-light-blocking state.

In step S903, the optical sensing unit senses a darkness pattern and transfers darkness pattern data to the control unit. The control unit determines a variation in shadings to perform a corresponding configured function. Hence, in step S905, the control unit performs a configured function based on the darkness pattern data. The process flow in the present embodiment applies to the optical mice in FIG. 6, FIG. 7A, and FIG. 7B in the previous embodiments. The process flow of FIG. 9 is not limited in the present embodiment.

To sum up, the present disclosure is an optical mouse, in which through the turning-off operation of a switch unit electrically connected to a light emitting unit, the light emitting unit generates a darkness or darkness pattern; or in which by a light shielding means through a shutter unit connected between the light emitting unit and the light guiding unit, the optical sensing unit senses the darkness or darkness pattern. Then, a control unit determines variations in shadings such as the darkness or darkness pattern to perform multi-level cursor displacement resolution switching, setting, or multiple configured functions. Thus, the convenience of the optical mouse in use is improved. As such, for the optical mouse, a complex-to-manufacture and interleaved switching circuit can be reduced, the working efficiency in the manufacturing process is improved, and the use and electrical connection of the IO port of the control unit is reduced.

The above description only provides embodiments of the present disclosure, but is not intended to limit the scope of the present disclosure.

What is claimed is:

1. An optical mouse, comprising:
a control unit;
an optical sensing unit electrically connected to the control unit; and
a switch unit electrically connected to a light emitting unit;
wherein when the switch unit is in a turn-on state, the light emitting unit emits light toward a tracing surface, the optical sensing unit senses light reflected by the tracing surface and transfers optical data to the control unit, and the control unit generates a pointer control signal of movement of a pointing cursor based on the optical data;
wherein when the switch unit is in a turn-off state, the light emitting unit stops emitting light toward the tracing surface, the optical sensing unit senses a darkness and transfers darkness data to the control unit, and the control unit performs a configured function based on the darkness data.

2. The optical mouse of claim 1, further comprising at least one button unit for activating the switch unit.

3. The optical mouse of claim 2, wherein when the at least one button unit is pressed, the switch unit is in a turn-off state instantaneously, such that the light emitting unit instantaneously stops emitting light to generate the darkness in a tracing space within the optical mouse.

4. The optical mouse of claim 2, wherein when the at least one button unit is pressed, the switch unit is instantaneously at any permutation of at least one turn-off state and at least one turn-on state, such that the light emitting unit generates a darkness pattern based on any permutation of at least one turn-off state and at least one turn-on state; the optical sensing unit senses the darkness pattern and transfers a darkness pattern data to the control unit; and the control unit performs the configured function based on the darkness pattern data.

5. The optical mouse of claim 4, wherein the darkness pattern is a code signal instructing the control unit to perform the corresponding configured function.

6. An optical mouse, comprising:
a control unit;
an optical sensing unit electrically connected to the control unit; and
a shutter unit disposed between a light emitting unit and a light guiding unit;
wherein when the shutter unit is in a non-light-blocking state, the light emitting unit emits light toward a tracing surface, the optical sensing unit senses light reflected by the tracing surface and transfers optical data to the control unit, and the control unit generates a pointer control signal of movement of a pointing cursor based on the optical data;
wherein when the shutter unit is in a light-blocking state, the shutter unit blocks light emitted by the light emitting unit toward the light guiding unit, the optical sensing unit senses a darkness and transfers darkness data to the control unit, and the control unit performs a configured function based on the darkness data.

7. The optical mouse of claim 6, further comprising at least one button unit connected with the shutter unit.

8. The optical mouse of claim 7, wherein when the at least one button unit is pressed, the shutter unit is in a light-blocking state instantaneously, such that the light emitting unit instantaneously stops emitting light to generate the darkness.

9. The optical mouse of claim 8, wherein the at least one button unit comprises an elastic element connected to the shutter unit, and the elastic element is configured to provide a recovering force for the shutter unit such that the shutter unit is restored from the light-blocking state to the non-light-blocking state.

10. The optical mouse of claim 7, wherein when the at least one button unit is pressed, the shutter unit is instantaneously at any permutation of at least one light-blocking state and at least one non-light-blocking state, such that the light emitting unit generates a darkness pattern based on any permutation of at least one light-blocking state and at least one non-light-blocking state; the optical sensing unit senses the darkness pattern and transfers a darkness pattern data to the control unit; and the control unit performs the configured function based on the darkness pattern data.

11. The optical mouse of claim 10, wherein the darkness pattern is a code signal instructing the control unit to perform the corresponding configured function.

12. The optical mouse of claim 11, wherein the at least one button unit comprises an elastic element connected to the shutter unit, and the elastic element is configured to provide a recovering force for the shutter unit such that the shutter unit is restored from the light-blocking state to the non-light-blocking state.

13. The optical mouse of claim 10, wherein the at least one button unit comprises an elastic element connected to the shutter unit, and the elastic element is configured to provide a recovering force for the shutter unit such that the shutter unit is restored from the light-blocking state to the non-light-blocking state.

14. The optical mouse of claim 7, wherein the at least one button unit comprises an elastic element connected to the shutter unit, and the elastic element is configured to provide a recovering force for the shutter unit such that the shutter unit is restored from the light-blocking state to the non-light-blocking state.

15. A method for performing a configured function of an optical mouse, wherein the optical mouse is provided with a control unit, an optical sensing unit, and a light emitting unit, and the control unit is electrically connected to the optical sensing unit, the method comprising:
a switch unit being electrically connected to the light emitting unit, and the switch unit being in a turn-off state to cause the light emitting unit to stop emitting the light;
sensing a darkness and transferring darkness data to the control unit by the optical sensing unit; and
performing the configured function based on the darkness data by the control unit.

16. The method for performing the configured function of the optical mouse of claim 15, wherein the step of the switch unit being in a turn-off state to cause the light emitting unit to stop emitting the light further comprises the steps of:
the switch unit being instantaneously at any permutation of at least one turn-off state and at least one turn-on state, such that the light emitting unit generates a darkness pattern based on any permutation of at least one turn-off state and at least one turn-on state;
sensing the darkness pattern and transferring a darkness pattern data to the control unit by the optical sensing unit; and
performing the configured function based on the darkness pattern data by the control unit.

17. A method for performing a configured function of an optical mouse, wherein the optical mouse is provided with a control unit, an optical sensing unit, and a light emitting unit, and the control unit is electrically connected to the optical sensing unit, the method comprising:
a shutter unit being used to block light outputted by the light emitting unit, the shutter unit being in a light-blocking state to cause the shutter unit to block light emitted by the light emitting unit toward a light guiding unit;
sensing a darkness and transferring darkness data to the control unit by the optical sensing unit; and
performing a configured function based on the darkness data by the control unit.

18. The method for performing the configured function of the optical mouse of claim 17, wherein the step of the shutter unit being in a light-blocking state to cause the shutter unit to block light emitted by the light emitting unit toward a light guiding unit further comprises the steps of:
the shutter unit being instantaneously at any permutation of at least one light-blocking state and at least one non-light-blocking state, such that the light emitting unit generates a darkness pattern based on any permutation of at least one light-blocking state and at least one non-light-blocking state;
sensing the darkness pattern and transferring a darkness pattern data to the control unit by the optical sensing unit; and
performing the configured function based on the darkness pattern data by the control unit.

* * * * *